Sept. 1, 1959  B. RIDGEWAY ET AL  2,902,116
AUTOMOBILE LIFT
Filed March 24, 1955  2 Sheets-Sheet 2
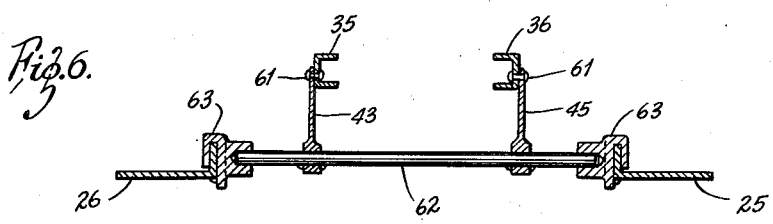
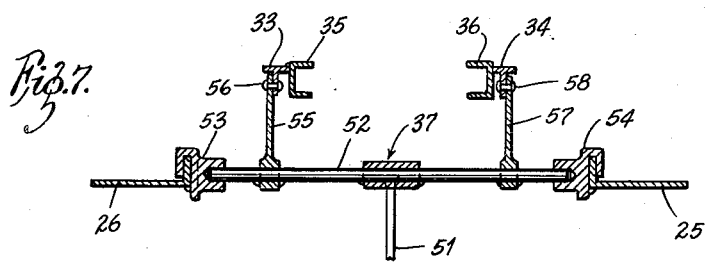
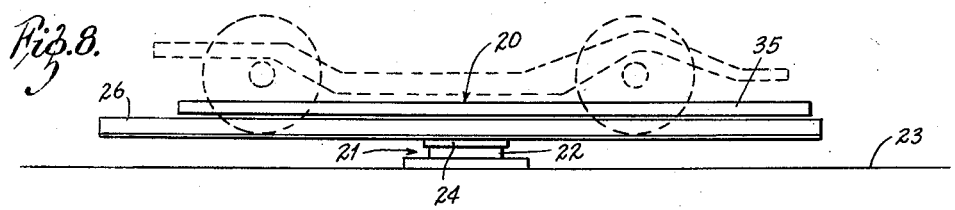
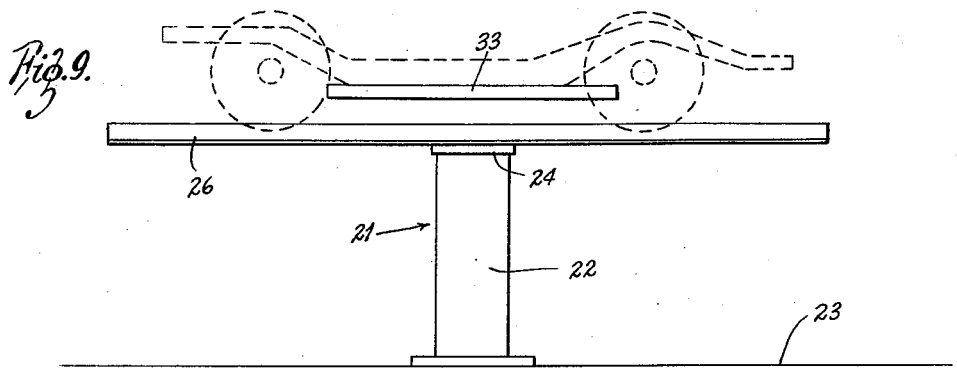
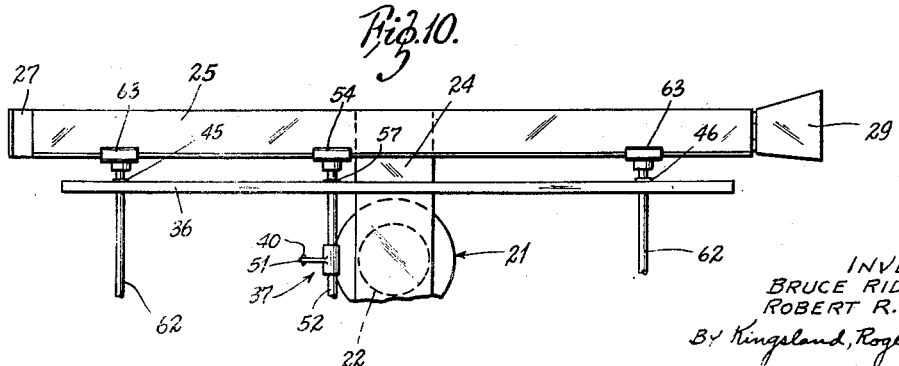
INVENTORS:
BRUCE RIDGEWAY,
ROBERT R. INGRAM,
By Kingsland, Rogers & Ezell
ATTORNEYS

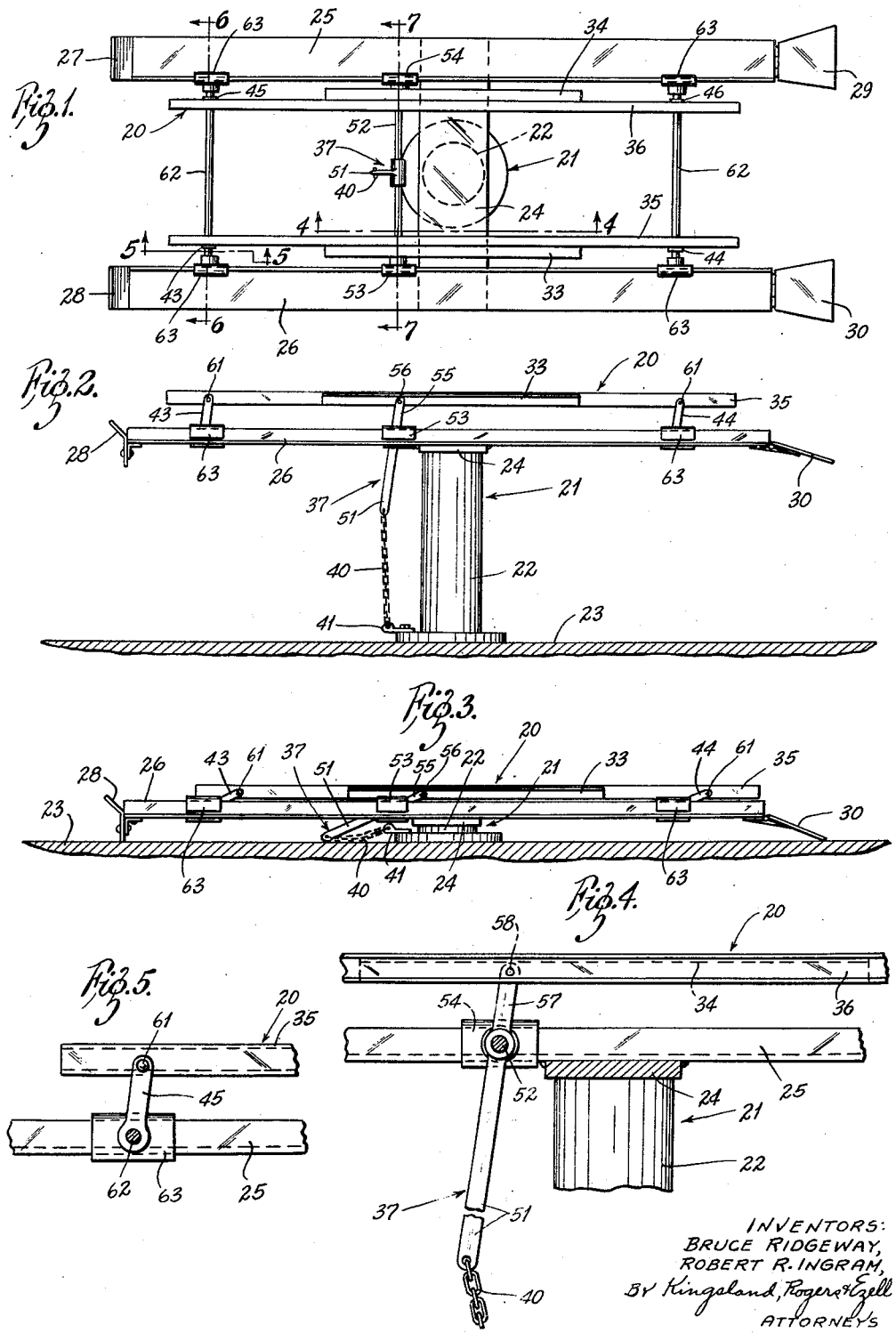

United States Patent Office 2,902,116
Patented Sept. 1, 1959

2,902,116

AUTOMOBILE LIFT

Bruce Ridgeway and Robert R. Ingram, Mexico, Mo.

Application March 24, 1955, Serial No. 496,526

1 Claim. (Cl. 187—8.43)

This invention relates to automobile lifts, and in particular is concerned with improvements in automobile lifts whereby an automatic support for raising a car off the wheel supports is provided.

In garages and service stations it is conventional practice to have an automobile lift apparatus whereby an automobile can be raised off the ground so that mechanics can work on the bottom of the car. In maintenance operations it is further desirable that a car may be supported off the ground in such a position that its wheels may be removed in order that certain parts may be made more accessible.

By means of this invention there has been provided a combined axle and frame support, or an axle or frame support only, for cars which can be used with standard automobile lifts whereby the car is supported automatically off its wheel supports when the lift is operated. Through the use of such axle or frame or combined supports and a lever arrangement connected therefrom to the standard wheel tracks of the conventional automobile lift and to the floor, an automatic raising of the automobile off its wheel supports is effectuated when the automobile lift is operated.

Accordingly, it is a primary object of this invention to provide an automobile lift device for use with conventional automobile lifts to raise a car automatically off its wheel supports and support it when the lift is operated.

It is a further object of this invention to provide an axle or frame support for supporting an automobile off its wheels when an automobile lift is operated through the provision of an automatic lever arrangement or other means to raise said supports with respect to the automobile lift when operated.

Another object of this invention is to provide a support for raising the bottom of a car off its wheels from the wheel tracks of an automobile lift upon the operation thereof by a relative raising of the support with respect to the wheel track at the latter portion of the operation of the automobile lift.

Still another object of this invention is to provide a support for raising the bottom of a car so that its wheels may be removed from the wheel track of an automobile lift through the use of a single pivotable lever connected to the support and the wheel track and the further provision of stabilizers between the support and the wheel track for maintaining the equilibrium of the support.

Yet another object of this invention is to provide a support for raising the bottom of a car off its wheels from the wheel track of a conventional automobile lift which is simple in its operation and construction so that it can be adapted to standard lifts.

Still a further object of this invention is to provide a support for raising the bottom of a car off its wheels from the wheel track of an automobile lift which can be constructed from standard materials of rugged construction in an installation which is easy to provide, maintain, and remove from operation.

Further objects of this invention will appear in the detailed description which follows and will be further apparent to those skilled in the art.

Reference will now be had to the accompanying drawings which show several embodiments of this invention. It is to be understood that these drawings are for the purpose of illustration only and that the invention is not limited to these showings which are for the purpose of example only.

In the drawings:

Figure 1 is a top plan view of the support incorporated in a conventional hydraulic automobile lift;

Figure 2 is a view in side elevation of the apparatus in its operated position;

Figure 3 is a view in side elevation similar to Figure 2, but showing the apparatus in its nonoperated or grounded position;

Figure 4 is an enlarged view showing the lever pivoting arrangement taken on the line 4—4 of Figure 1;

Figure 5 is an enlarged view taken on line 5—5 of Figure 1 showing the stabilizer structure;

Figure 6 is a view taken on line 6—6 of Figure 1; showing the stabilizer structure;

Figure 7 is a view on line 7—7 of Figure 1 showing the lever connection to the car support;

Figure 8 is a schematic view in side elevation of a modified apparatus in nonoperated position where an axle support only is employed;

Figure 9 is a schematic view in side elevation of a further modification of the apparatus in operated position where a frame support only is employed; and Figure 10 is a fragmentary view similar to Figure 1 showing the employment of a modification using only an axle support.

The supporting apparatus of this invention is generally indicated at 20 in Figures 1, 2 and 3 for use with a conventional hydraulic automobile lift 21. The automobile lift 21 is composed of the standard hydraulic power cylinder 22 which is adapted to be elevated from a bore in the floor 23 in the usual manner.

The automobile lift 21 is further conventionally provided with a lateral base support 24 to which are attached two wheel tracks 25 and 26. These wheel tracks are provided with the usual permanent stops 27 and 28 at one end and the hinged plates 29 and 30 at the opposed end.

The support 20 includes frame supports 33 and 34 which are connected to vertically offset axle supports 35 and 36, respectively. These supports are, in turn, connected to a lever generally indicated at 37. In the embodiment shown in Figures 1 through 7 the axle and frame supports are shown connected to one another and used together. It is, however, to be understood as will appear more fully below that, if desired, they can be used separately, as shown in Figures 8 and 10 for the axle support, and Figure 9 for the frame support.

The lower end of the lever is connected to a chain 40 having its opposite end fastened to a bracket 41 at the base of the automobile lift. Although not shown, it is to be understood that a pin can connect the chain 40 to the bracket 41 for easy disengagement of the lever arrangement or other conventional disengaging means may be used, as is apparent.

The other main elements of the support of this invention which are utilized with the conventional automobile lift are four stabilizers 43, 44, 45 and 46, respectively, which are connected between the axle supports and the wheel tracks. Where the frame support is used without the axle support, it will be readily understood that these stabilizers are connected between the frame support and the wheel tracks of the automobile lift rather than the axle supports.

The specific structure of the lever 37 is best shown in Figures 4 and 7. A lower rod 51 is connected at one end to the chain 40 and at the other end to a shaft 52 which is journaled in housings 53 and 54 connected to wheel tracks 26 and 25, respectively. The rod 51 is rigidly connected to shaft 52 by welding or other conventional means. A bar 55 is rigidly connected to the shaft 52 by welding or the like and is provided with a pivot pin 56 fastening the upper end of the bar to the frame support 33. In like manner, a bar 57 is rigidly connected to the shaft 52 and to the frame support 34 by a pin 58.

The specific structure of the stabilizers is best shown in Figures 5 and 6. Each of the stabilizers 43, 44, 45 and 46 are composed of the same elements and like numerals will be used for the same components. In Figure 5 the stabilizer 43 is shown as consisting of a link fastened to the axle support 35 by a pin 61 and to the wheel track 26 by a shaft 62. This provides for pivotable operation of the axle support about the wheel track so as to maintain horizontal parallelism and stability at all times. The shaft 62 is pivotally supported within a journal 63 fastening over the wheel rail.

In the modification of Figures 8 and 10 the axle support is utilized without the frame support. The axle supports 35 and 36 are spaced together a distance such that they will not engage the frame of the automobile. In Figure 8 the connecting linkages and lever is not shown for purpose of simplicity. In this modification the axle supports are designed to contact the wheel axles in the same manner as the embodiment in Figures 1 through 7, but without the use of the frame support. Thus, Figure 10 shows that the mechanical arrangement is similar to that shown for Figures 1 through 7, as will be apparent.

The embodiment of Figure 9 is shown without the connecting linkages also for the purpose of simplicity. Here the lift is shown just as it begins to contact the underneath side of the frame and before the automobile lift 21 is fully raised by the piston 22 and just prior to the point where the wheels are raised off the wheel track. In this embodiment, it is apparent that the frame elements 33 and 34 are shorter than the axles and the entire weight for supporting the car is borne upon the frame rather than the axle and the frame as in the embodiment of Figures 1 to 7, or the axles alone as in the embodiment of Figures 8 and 10.

Operation

The operation of this apparatus is best described by first referring to Figure 3. In this position the automobile lift is in the nonoperated or grounded state and an automobile is driven up over the plates 29 and 30 onto the wheel tracks 26 and 25 in the conventional manner. The wheel plates 29 and 30 are then closed to prevent backing of the machine off the tracks and the automobile lift 21 is caused to operate wherein the piston 22 will raise up from the floor 23 to the fully elevated position of Figure 2.

As the elevation of the automobile lift takes place, it will be apparent that the lever 37 will be permitted to pivot in the journals 53 and 54 through the operation of the shaft 52 journaled therein. Because of the foreshortened arrangement of the chain 40 attached to the lower end of the lever 37 and to the floor bracket 41 at the opposite end of the chain, the lever is caused to operate in a counterclockwise manner about the shaft 52. Thus, as the automobile lift is operated in its last portion of elevation due to this foreshortening of the chain 40, the lever will cause the axle and frame supports 35, 33, 36 and 34 to be elevated. They are permitted to rotate with respect to the integral bars 55 and 57 of the lever 37 through the pivot pins 56 and 58. Thus, it can be seen that when the automobile lift is fully elevated, the wheels of the car are caused to be raised off the wheel tracks through the raising of the support generally indicated at 20 by contacting the bottom of the car and lifting the same.

Full stabilization is effected by the stabilizers 43, 44, 45 and 46 which permit pivotal operation through the shaft 62 and the pins 61 between the wheel tracks and the axle supports. This maintains stability at all times and keeps the support 20 horizontal and parallel to the wheel tracks.

It will be further noted that in this operation the actual load bearing relationship will not be effected until the lever 37 has rotated counterclockwise to substantially the position shown in Figure 2 since the support 20 does not contact the bottom of the car until the latter part of the operation of elevation. By this manner greater power is effected since there is less bending and torsion upon the lever 37 so that the stress and strain are minimized upon the apparatus.

In the embodiment of Figures 1 through 7 the combination of the axle and frame support functions in a manner that the frame of the automobile is first contacted by the frame supports 33 and 34 of the support 20. This causes the frame, through spring action, to be elevated slightly with respect to the axles which are then contacted by the axle supports 35 and 36 so that the full load of the automobile is then distributed between the frame and the axle which is desirable to prevent undue stress upon any one of these parts.

Where desired, however, a frame support device can be used alone as shown in Figure 9. Thus, if it is desirable that the axles of the automobile be worked upon, this embodiment can be utilized.

Likewise, where an axle support is desired to be utilized only with the elimination of the frame support, the embodiment of Figures 8 and 10 can be employed. In this manner the frame is not contacted since the frame supports have been removed.

In the operation of this invention it can be seen that the automobile is automatically lifted off its wheels by the operation of the conventional automobile lift 21. This is effected through the use of a single lever mechanism and it is apparent that the extent of the lift can be modified by correlation of the length of the chain 40 with respect to the distance through which the pistons 22 of the automobile lift move. The support 20 for lifting the car off the wheel tracks of the conventional lift is of simplified design so it can be readily employed with any conventional automobile lift which operates in a vertical manner as is the normal case. No complicated manipulation, settings or fastenings of any kind are required and the whole operation through the use of this invention is automatically effected so that disrepair, faulty operation and the like are avoided.

It will be apparent that various changes and modifications may be made for this invention within the teachings thereof. Such changes and modifications as are apparent within the skill of the art are intended to be within the scope of this invention as defined by the claim appended hereto.

What is claimed is:

An automobile bottom support for use with an automobile lift having vertically adjustable and reciprocable wheel tracks, said support being adapted to raise the automobile off its wheels from said wheel tracks including contact means for contacting the bottom of said automobile, and operating means responsive to the elevation of said wheel tracks for raising said contacting means relative thereto into contact with the bottom of the car and raising it off its wheels, said contact means including support elements having a pair of first and second vertically offset surfaces, said first surfaces being disposed exteriorly of and beneath said second surfaces and terminating short of the ends of said second surfaces, said first surface being adapted to contact the frame of the automobile, and said second surface being adapted thereafter to contact the axles of the said automobile to distribute the weight of said automobile between said frame and axles.

References Cited in the file of this patent

UNITED STATES PATENTS

| | | |
|---|---|---|
| 1,555,637 | Davis | Sept. 29, 1925 |
| 1,843,852 | Troy | Feb. 2, 1932 |
| 2,612,344 | Thompson | Sept. 30, 1952 |

FOREIGN PATENTS

| | | |
|---|---|---|
| 690,682 | France | June 24, 1930 |